United States Patent
Uluyol et al.

(10) Patent No.: US 7,506,517 B2
(45) Date of Patent: *Mar. 24, 2009

(54) SYSTEM AND METHOD FOR TURBINE ENGINE STARTUP PROFILE CHARACTERIZATION

(75) Inventors: Onder Uluyol, Fridley, MN (US); Kyusung Kim, Plymouth, MN (US); Charles M. Ball, Gilbert, AZ (US)

(73) Assignee: Honeywell International, Inc., Morristown, NJ (US)

( * ) Notice: Subject to any disclaimer, the term of this patent is extended or adjusted under 35 U.S.C. 154(b) by 407 days.

This patent is subject to a terminal disclaimer.

(21) Appl. No.: 11/239,882

(22) Filed: Sep. 30, 2005

(65) Prior Publication Data

US 2007/0234734 A1 Oct. 11, 2007

Related U.S. Application Data

(60) Provisional application No. 60/630,705, filed on Nov. 23, 2004.

(51) Int. Cl.
*F02C 7/26* (2006.01)
*F02C 7/22* (2006.01)
*F01N 3/00* (2006.01)
*F02B 5/00* (2006.01)
*F02M 51/00* (2006.01)
*G06F 19/00* (2006.01)
*G06F 11/30* (2006.01)
*G06F 15/00* (2006.01)
*G06G 7/70* (2006.01)
*G21C 17/00* (2006.01)

(52) U.S. Cl. ............. 60/786; 60/284; 60/286; 60/778; 123/305; 123/491; 701/100; 702/183

(58) Field of Classification Search ............... 60/776, 60/778, 786, 787, 790, 800, 284, 286; 701/29, 701/34, 99, 100; 702/130, 182, 183, 185; 123/179.17, 305, 491, 641; 324/115; 340/945, 340/973
See application file for complete search history.

(56) References Cited

U.S. PATENT DOCUMENTS

| | | | |
|---|---|---|---|
| 3,959,635 A | | 5/1976 | Tanco |
| 4,267,458 A | | 5/1981 | Uram et al. |
| 4,770,135 A | * | 9/1988 | Jautelat et al. .......... 123/179.17 |
| 4,821,216 A | * | 4/1989 | Howell et al. ................. 701/99 |
| 4,891,971 A | | 1/1990 | Jones et al. |
| 4,894,782 A | | 1/1990 | Alcock et al. |

(Continued)

*Primary Examiner*—Crystal J Barnes Bullock
(74) *Attorney, Agent, or Firm*—Ingrassia Fisher & Lorenz, P.C.

(57) ABSTRACT

A system and method is provided for startup characterization in a turbine engine that provides the ability to accurately characterize engine startup. The startup characterization system and method uses engine temperature sensor data and engine speed sensor data to accurately characterize the startup of the turbine engine by determining when several key engine startup conditions are reached. By storing and analyzing engine sensor data taken during these key conditions of engine startup, the system and method is able to accurately characterize the performance of the engine during startup. This information can be used as part of a trending system to determine when faults in the start transient regime are occurring or likely to occur. Additionally, this information can be used in real time by control systems to better control the startup and operation of the turbine engine.

20 Claims, 4 Drawing Sheets

U.S. PATENT DOCUMENTS

| | | |
|---|---|---|
| 5,107,674 A | 4/1992 | Wibbelsman et al. |
| 5,303,541 A | 4/1994 | Goff et al. |
| 5,479,350 A * | 12/1995 | Barakchi et al. ............ 701/100 |
| 5,748,500 A | 5/1998 | Quentin et al. |
| 5,794,586 A * | 8/1998 | Oda et al. ................... 123/305 |
| 6,470,258 B1 | 10/2002 | Leamy et al. |
| 6,498,978 B2 | 12/2002 | Leamy et al. |
| 6,694,246 B2 * | 2/2004 | Masuda et al. .............. 701/114 |
| 6,988,368 B2 * | 1/2006 | O'Connor .................... 60/778 |
| 7,149,607 B2 * | 12/2006 | Dorey et al. .................... 701/1 |
| 7,216,489 B2 * | 5/2007 | Uluyol et al. ................. 60/778 |
| 2004/0176879 A1 | 9/2004 | Menon et al. |
| 2006/0195248 A1* | 8/2006 | Kim et al. ................... 701/100 |

* cited by examiner

SYSTEM AND METHOD FOR TURBINE ENGINE STARTUP PROFILE CHARACTERIZATION

RELATED APPLICATIONS

This application claims the benefit of U.S. Provisional Application No. 60/630,705, filed Nov. 23, 2004.

FIELD OF THE INVENTION

This invention generally relates to combustion engines, and more specifically relates to startup characterization in turbine engines.

BACKGROUND OF THE INVENTION

Modem aircraft are increasingly complex. The complexities of these aircraft have led to an increasing need for automated fault detection systems. These fault detection systems are designed to monitor the various systems of the aircraft in an effect to detect potential faults. These systems are designed to detect these potential faults such that the potential faults can be addressed before the potential faults lead to serious system failure and possible in-flight shutdowns, take-off aborts, and delays or cancellations.

Turbine engines, including main power and auxiliary power engines are of course, a particularly critical part of the aircraft. As such, fault detection for turbine engines are an important part of an aircraft's fault detection system. One area where fault detection has been lacking is in transient conditions such as during startup of a turbine engine. One problem with fault detection during startup has been the inability of fault detection systems to accurately and reliably determine when the various conditions in engine startup have occurred, such as lightoff and engine idle. During startup of a turbine engine, a starter motor rotates the turbine engine while the combustor provides fuel that is ignited by the igniter. Engine lightoff is defined as the time when combustion has been initiated and the engine itself begins to provide torque, as opposed to being driven solely by the starter. The engine then continues to increase in speed until full idle speed is reached.

Without an accurate determination of when these conditions occur it is difficult to compare measurements from multiple startups of a given engine or large engine sample under varying ambient conditions and with varying component health states, and thus difficult to trend or otherwise detect faults that are or will be occurring in the turbine engine.

Another problem with fault detection during startup has been the large amounts of data typically required to analyze the performance of the engine during startup. In many cases such large amounts of data cannot be reasonably stored and passed to the fault detection system due to limitations in hardware. This again has limited the ability of fault detection and control systems.

BRIEF SUMMARY OF THE INVENTION

The present invention provides a system and method for startup characterization in a turbine engine that provides the ability to accurately characterize engine startup. The startup characterization system and method uses engine temperature sensor data and engine speed sensor data to accurately characterize the startup of the turbine engine by determining when several key engine startup conditions are reached.

In one embodiment, the system characterizes engine startup by determining when seven key conditions of engine startup are reached. These seven conditions include: (i) starter on; (ii) maximum engine speed gradient; (iii) lightoff; (iv) maximum temperature gradient; (v) $3^{rd}$-phase; (vi) peak temperature; and (vii) idle speed.

By storing and analyzing engine sensor data taken during these key conditions of engine startup, the system and method is able to accurately characterize the performance of the engine during startup. This information can be used as part of a trending system to determine when faults in the start transient regime are occurring or likely to occur. Additionally, this information can be used in real time by control systems to better control the startup and operation of the turbine engine.

Furthermore, the system and method provide this ability to characterize the engine startup performance using only the sensor data taken during the key conditions. This significantly reduces the amount of data needed for fault detection or control. Thus, the system and method can facilitate improved fault detection and control even when hardware limits the ability to store and process large amounts of data during startup.

BRIEF DESCRIPTION OF DRAWINGS

The preferred exemplary embodiment of the present invention will hereinafter be described in conjunction with the appended drawings, where like designations denote like elements, and.

DETAILED DESCRIPTION OF THE INVENTION

The present invention provides a system and method for startup characterization in a turbine engine that provides the ability to accurately characterize engine startup. The startup characterization system and method uses engine temperature sensor data and engine speed sensor data to accurately characterize the startup of the turbine engine by determining when several key engine startup conditions are reached, and capturing snapshots of data during those key conditions.

Figure 1:
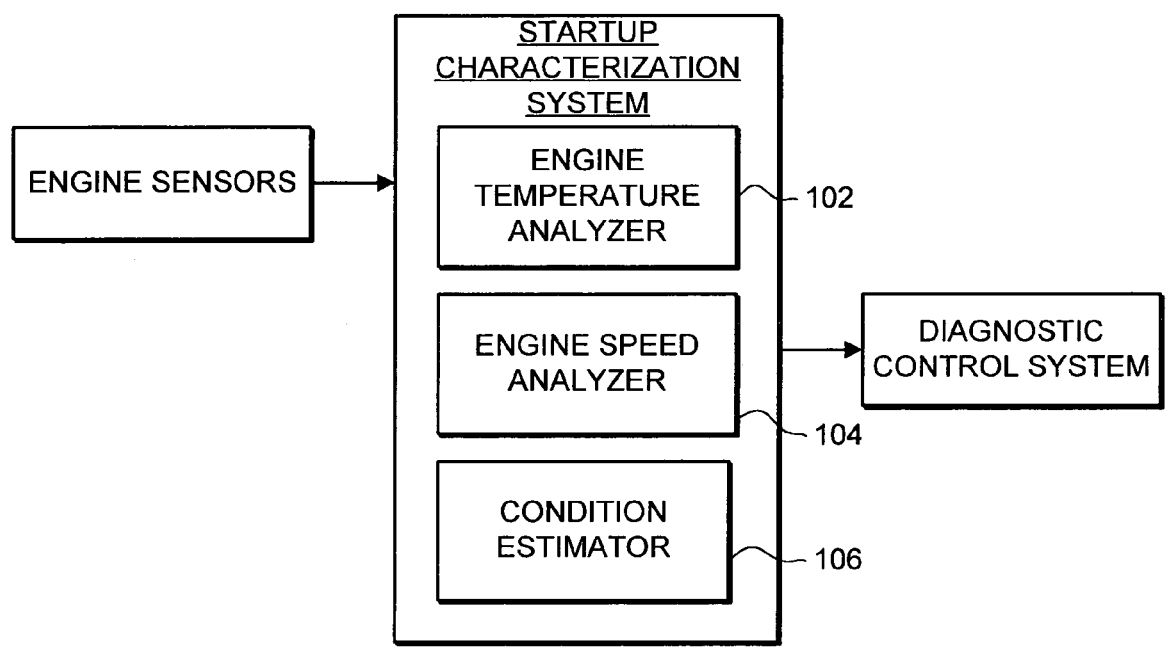
FIG. 1 is a schematic view of a startup characterization system.

Turning now to FIG. 1, a startup characterization system 100 is illustrated schematically. The startup characterization system 100 includes an engine temperature analyzer 102, an engine speed analyzer 104, and a condition estimator 106. The startup characterization system 100 first receives the engine temperature sensor data and engine speed sensor data for the turbine engine during startup. The engine temperature analyzer 102 and engine speed analyzer 104 process the sensor data to determine when certain conditions occur during turbine engine startup. The condition estimator 106 captures snapshots of sensor data taken during key conditions. The key conditions in which the condition estimator 106 captures sensor data includes the conditions identified by the engine temperature analyzer 102 and engine speed analyzer 104 and can include other conditions as well. The captured snapshots of sensor data associated with these conditions are then passed to the diagnostic control system, where they can be used for fault detection and/or control of the turbine engine.

In one embodiment, the startup characterization system 100 determines when seven key conditions are reached during startup. These seven conditions include: (i) starter on; (ii) maximum engine speed gradient; (iii) lightoff; (iv) maximum temperature gradient; (v) $3^{rd}$-phase; (vi) peak temperature; and (vii) idle speed. The sensor data associated with one or more of these seven conditions can be stored and used to characterize the performance of the turbine engine. Of these, the maximum engine speed gradient, lightoff, maximum temperature gradient, $3^{rd}$-phase, peak temperature, and idle speed can each be identified using the engine temperature analyzer 102 and/or engine speed analyzer 104. The starter on condition would typically be identified using data from the engine control system.

Figure 2:
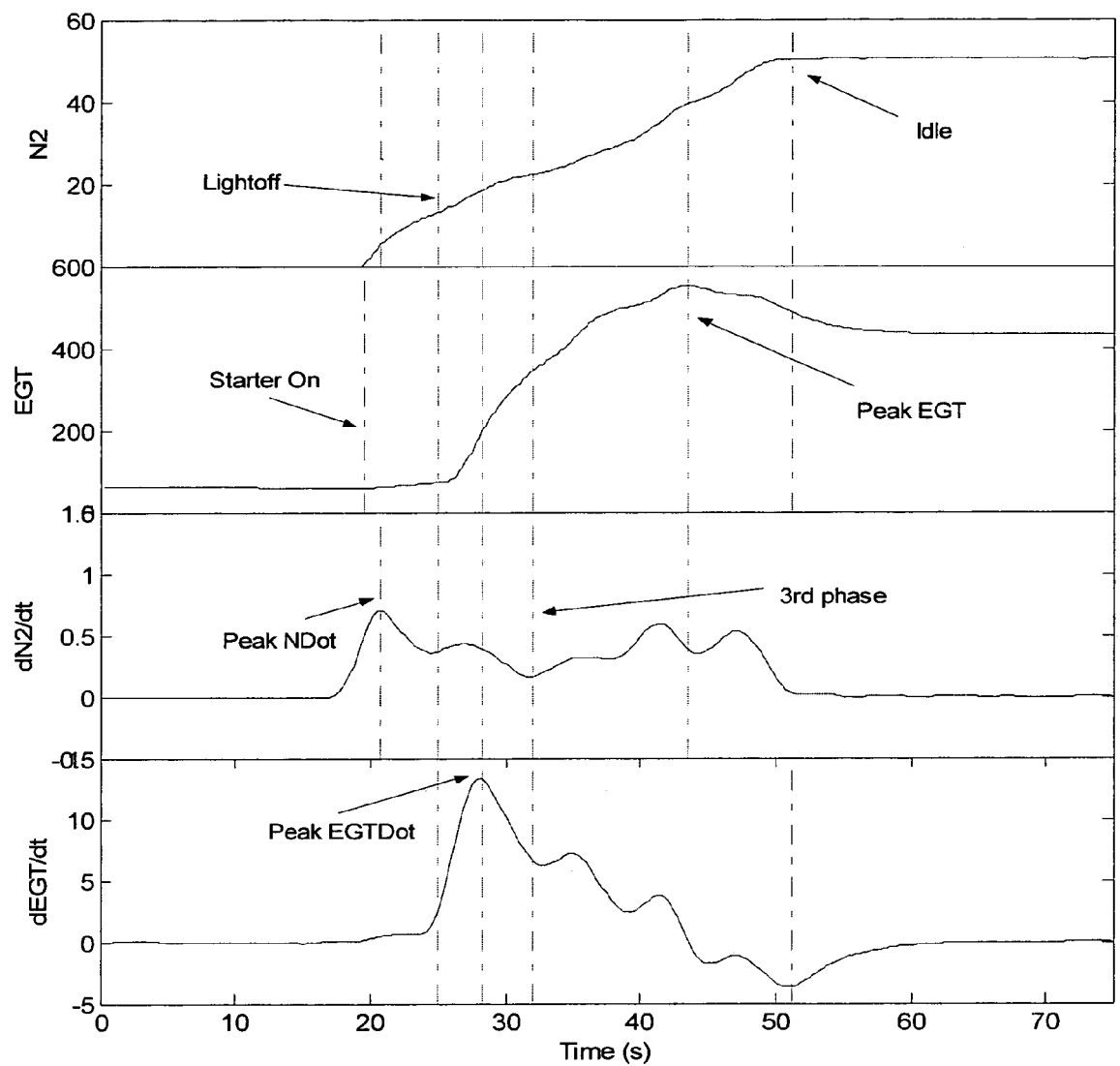
FIG. 2 is a graph sensor data during an exemplary turbine engine startup.

Turning now to FIG. 2, a graph 190 illustrates the engine speed (N2), exhaust gas temperature (EGT), engine speed gradient (dN2/dt), and exhaust gas temperature gradient (dEGT/dt) for an exemplary turbine engine startup. Additionally, the graph 190 illustrates the time of the seven key conditions that will be used to characterize the startup of the turbine engine. The first key condition is when the starter is turned on. The second key condition is when the maximum engine speed gradient is reached, labeled Peak N Dot in FIG. 2. The third key condition is when the lightoff occurs. The fourth key condition is when the maximum temperature gradient is reached, labeled Peak EGT Dot in FIG. 2. The fifth key condition is when the $3^{rd}$-phase is reached. The sixth key condition is when the peak temperature is reached, labeled peak EGT in FIG. 2. Finally, the seventh key condition is when idle speed is reached.

In general, the starter on condition occurs when the starter is turned on and begins to rotate the engine. The maximum engine speed gradient occurs when the engine speed has its highest rate of change during startup, typically shortly after the starter is turned on. Lightoff occurs when the ignition successfully completes and the combustor is able to sustain combustion. The maximum temperature gradient occurs when the engine temperature has its highest rate of change during startup.

$3^{rd}$-phase, also sometimes referred to as "midway-to-idle" or "acceleration-to-self-sustain-speed", generally occurs during startup when the engine reaches and accelerates through a speed regime where the airflow through the front stages of the compressor becomes unstable. For example, when the airflow becomes unstable due to encountering a stall condition.

Peak temperature occurs when the engine reaches its peak temperature during startup, and typically occurs after the $3^{rd}$-phase. Finally, idle occurs when the engine reaches its idle speed, typically defined as 50-51% of full engine speed. In one exemplary embodiment, the startup characterization system 100 captures sensor data taken during each of these seven conditions. It should be noted that the data captured at these seven conditions need not be limited to speed and engine temperature sensors only, but other relevant sensors such as power lever angle (PLA), fuel flow and others could be included as needed. It should also be noted that not all sensor data needs to be captured at all conditions. For example, at some conditions only the EGT data is captured and stored for characterization. At other conditions, only the relative time that a particular condition occurred is captured and stored for characterization. The captured sensor data can then be passed to a diagnostic control system to evaluate the performance of the engine during startup. Because only data from the seven key conditions are required, the system provides startup characterization with reduced data processing requirements.

Specifically, by storing and analyzing engine sensor data taken during these key conditions of engine startup, the system and method is able to accurately characterize the performance of the engine during startup. This information can be used as part of a trending system to determine when faults in the start transient regime are occurring or likely to occur. Additionally, this information can be used in real time by control systems to better control the startup and operation of the turbine engine.

Furthermore, the system and method provide this ability to characterize the engine startup performance using not high speed time series data but instead only a snapshot of sensor data taken during the key conditions. In this application, a snapshot of sensor data is defined as one or more samples of a data type collected at or around a selected instance. In most cases, only one sample of each data type is collected at each instance, but in some cases a small set of samples may be taken. For example, the snapshot could include data from the last 2 seconds before a condition occurs. A snapshot could thus include the time instants of each one of the key conditions and the sensor values observed at these instants. An on-board data acquisition system could also include data filtering and conditioning to eliminate anomalous data and only record validated and/or averaged data. This significantly reduces the amount of data needed to be captured for fault detection or control. Thus, the system and method can facilitate improved fault detection and control even when hardware limits the ability to store and process large amounts of data during startup.

As stated above, using snapshots of sensor data taken at these key conditions during engine startup, the system and method is able to accurately characterize the performance of the engine during the startup. As stated above, in one exemplary embodiment the seven key conditions include: (i) starter on; (ii) maximum engine speed gradient; (iii) lightoff; (iv) maximum temperature gradient; (v) $3^{rd}$-phase; (vi) peak temperature; and (vii) idle speed. Of these, the maximum engine speed gradient, lightoff, maximum temperature gradient, $3^{rd}$-phase, peak temperature, and idle speed can each be identified using the engine temperature analyzer 102 and/or engine speed analyzer 104. For example, to locate the maximum temperature gradient the engine temperature analyzer 102 would process incoming temperature sensor data and determine when the peak temperature and the maximum temperature gradient have occurred. Typically, the system would be configured to limit the search for the peak temperature and the maximum temperature gradient during those times in which they are likely to occur in the engine of interest. Those time periods would be identified using relationships with other data, such as when the starter turned on, or when the maximum temperature gradient was reached. Likewise, the engine speed analyzer 104 would determine when the maximum engine speed gradient is reached and when the idle speed is reached. In all these cases the system would then capture the desired snapshots of data taken at the time of the key conditions.

It should be noted that variety of types of engine temperature and engine speed data can be used. For example, the engine temperature data can comprise sensor data from any hot section on the turbine engine. Specifically, the engine temperature data can include exhaust gas temperature (EGT) sensor data. Likewise, the engine speed data can comprise a variety of engine rotational speed measurements, such as rotational fan speed (commonly referred to as N1) or rotational core speed (commonly referred to as N2) measurements within the turbine engine. Of course, other engine data could be used, such as fuel flow data and Power Lever Angle (PLA) data. The engine sensor data would typically be provided from an electronic control system designed to monitor the required engine parameters. This sensor data would typically monitor the engine parameters at a relatively high sampling rate, on the order of 1 Hz or higher in many applications. Many modern engines include electronic control systems that can provide the needed engine parameters for startup characterization.

A variety of mathematical techniques can be used to determine the gradients and times of the peak gradients in the sensor data. For example, a numerical gradient can be computed using a forward, backward, or central difference formula. The central difference formula is preferred in most applications for its accuracy. In general, a central difference formula is one where the numerical first derivative at a time $t_i$ is computed by subtracting the sensor value at time $t_{i-1}$ from the value at time $t_{i+1}$ and dividing the result by $(t_{i+1}-t_{i-1})$. This three-point symmetric calculation results in a numerical derivative with an error on the order of $h^2$, where $h=(t_{i+1}-t_{i-1})$.

If the sampling rate of sensor readings is low, filtering the signal for smoothing should be done as part of determining the gradient. Otherwise, the large step size resulting from a low sampling rate could lead to inaccurate and fluctuating derivatives that would make determining the peak value difficult. A zero-phase digital filter is one filter that can be used to accurately determine the times that the smoothed derivatives of sensor readings reach their peaks. A zero-phase digital filter is special case of a linear phase filter in which the time shift is zero. One possible way of implementing a zero-phase filter is using forward and backward filtering. For example, the filtfilt function in Matlab can be used to perform this function by filtering a sequence in the forward direction, and then reversing the sequence and running it back through the filter. In should also be noted that in most cases, the sampling rate of the sensors would preferably be higher than 1 Hz to account for the fact that the changes in the derivatives of exhaust gas temperature and engine speed that are of interest take place within a few seconds in a typical gas turbine engine.

Figure 3:
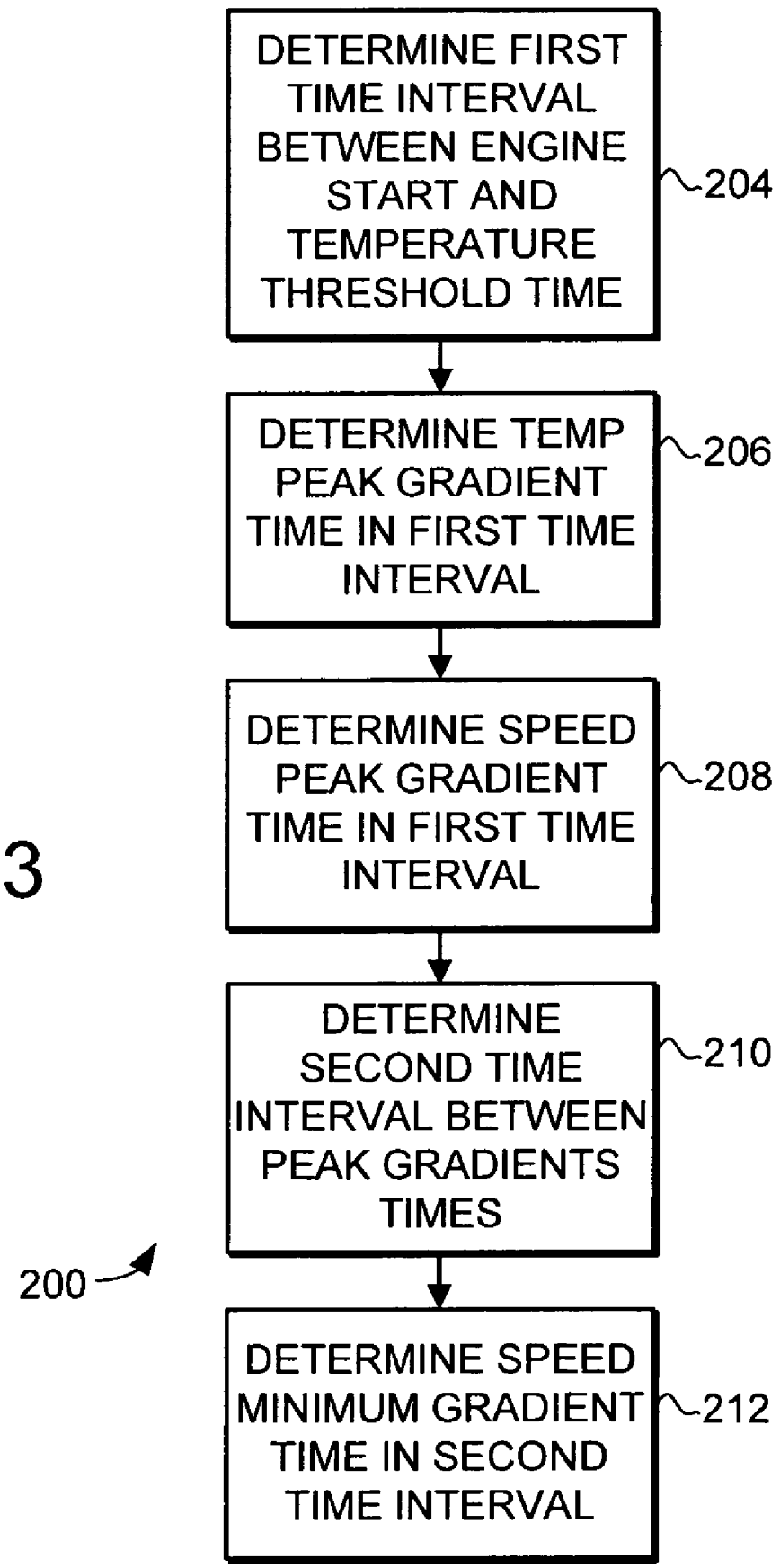
FIG. 3 is a flow diagram of an exemplary method for detecting lightoff in a turbine engine.

Typically, the processes used for determining when lightoff and $3^{rd}$-phase occurs would involve more significant computation using multiple different types of sensor data. Turning now to FIG. 3, an exemplary lightoff detection method 200 is illustrated. The method 200 uses engine temperature and engine speed sensor data to determine a first time interval during which the lightoff is estimated to have occurred.

The first step 204 is to determine a first time interval between the engine start of and a threshold temperature time. This first time interval is a first estimation of a time interval in which lightoff can be assumed to have occurred. The engine start time at the beginning of the interval can be any suitable time in the starting process. As one example, the engine start time can be the time when the starter motor begins to rotate the engine. This would typically be detected by the engine speed sensor. Of course, other suitable reference points around this time can be used instead.

Likewise, the threshold temperature time is a time when the engine reaches a threshold temperature that indicates that lightoff has occurred. Preferably, the threshold temperature used for this time is selected to assure that lightoff has always occurred before this threshold temperature is reached. However, it is also desirable not to set the threshold temperature so high as to make the time significantly later than lightoff and increase the first interval time. As one specific example, a threshold value for the exhaust gas temperature of an engine can be determined using testing and/or other analysis. In this case, the threshold value is an exhaust gas temperature value that is high enough to assure that lightoff has occurred when the exhaust gas temperature reaches this value. For example, a typical propulsion engine could use 371 degrees F. as the threshold value.

Thus, in step 204 a first time interval that is not unjustifiably large can be found in which lightoff can reasonably be assumed to have occurred. The next step 206 is to determine a temperature peak gradient time in the first time interval. The temperature peak gradient time in the first time interval is the time in the first time interval when the temperature is increasing the fastest. Stated another way, the temperature peak gradient time occurs at the time of highest slope in the temperature plot during the first time interval. Again, a variety of mathematical techniques, including those discussed above, can be used to determine the time of the peak.

The next step 208 is to determine an engine speed peak gradient time in the first time interval. The engine speed peak gradient time in the first time interval is the time in the first time interval when the engine speed is increasing the fastest. Stated another way, the engine speed peak gradient time occurs at the time of highest slope in the engine speed plot during the first time interval. Again, a variety of mathematical techniques can be used to determine the time of the peak gradient for the engine speed, such as central difference formulas and zero-phase filters.

The next step 210 is to determine a second time interval between the peak gradient times. Specifically, the second time interval is the time interval between the engine speed peak gradient time and the temperature peak gradient time. The second time interval narrows the estimation from the first time interval of when lightoff was to have occurred. Thus, the second time interval corresponds to a more accurate estimation of the time period when the engine lightoff is to have occurred.

The last step 212 is to determine an engine speed minimum gradient time in the second time interval. The engine speed minimum gradient time in the second time interval is the time in the second time interval when the engine speed is increasing the slowest. Stated another way, the engine speed minimum gradient time occurs at the time of the smallest slope in the engine speed plot during the second time interval. Again, a variety of mathematical techniques can be used to determine the time of the minimum gradient for the engine speed, such as central difference formulas and zero-phase filters.

The engine speed minimum gradient time corresponds to a more accurate estimation of when lightoff has occurred in turbine engine. Thus, the engine speed minimum gradient time determined in step 212 can be used as an accurate approximation of when lightoff has occurred. A snapshot of sensor data can then be captured and combined with other measurements to provide a startup characterization that is used in a variety of procedures, including trending and real time turbine engine control systems. More information on systems and methods that can be used for detecting when lightoff has occurred can be found at U.S. patent application Ser. No. 10/855,477 entitled "System and Method for Lightoff Detection in Turbine Engines."

Like detecting lightoff, accurately detecting when $3^{rd}$-phase occurs will generally be done by processing the engine speed and temperature data. As described above, $3^{rd}$-phase, also sometimes referred to as "midway-to-idle" or "acceleration-to-self-sustain-speed", occurs during startup when the engine reaches and accelerates through a speed regime where the airflow through the front stages of the compressor becomes unstable. For example, when the airflow becomes unstable due to encountering a stall condition. Specifically, the instability can cause what is referred to as a "rotating stall". Several different methods can be used to identify the $3^{rd}$-phase condition. For example, the $3^{rd}$-phase can be identified by locating a local minimum in the engine core speed and/or exhaust gas temperature gradient.

As one specific example, the $3^{rd}$-phase is located by first identifying a time interval after lightoff in which the $3^{rd}$-phase can be assumed to occur. The precise time interval used would depend on a variety of factors, and would typically be engine dependent. Then, the engine speed data from the time interval is then analyzed. In one embodiment, the $3^{rd}$-phase is identified by determining a local minimum of the engine speed gradient within the time interval. The local minimum of the engine speed gradient corresponds to the stall condition that occurs at the $3^{rd}$-phase time, and thus is used to identify the start of the $3^{rd}$-phase. Again, the local minimum can be located using any suitable mathematical technique.

In some cases it will be desirable to use the temperature gradient to locate the $3^{rd}$-phase. In this case, the temperature data from the time interval is then analyzed and the $3^{rd}$-phase is identified by determining a local minimum of the temperature gradient within the time interval. In yet another variation, a combination of temperature data and engine speed data is used. For example, a weighted average of the engine speed gradient and temperature gradient can be used to locate the $3^{rd}$-phase. In all cases, the $3^{rd}$-phase is identified and sensor data taken at the $3^{rd}$-phase is used to characterize the startup of the turbine engine.

Thus, by storing and analyzing engine sensor data taken during these key conditions of engine startup, the system and method is able to accurately characterize the performance of the engine during startup. This information can be used as part of a trending system to determine when faults in the start transient regime are occurring or likely to occur. Additionally, this information can be used in real time by control systems to better control the startup and operation of the turbine engine.

For example, for startup characterization by the system and method can be used in trending for fault detection during startup of the engines. Trending generally uses multiple sets of engine data to estimate and predict performance of the engine. For example, using data from multiple startup procedures on the turbine, trending can be used to more accurately estimate engine performance during startup, predict future performance and detect likely faults. Stated another way, trending can involve filtering the data to generate a more accurate, filtered estimate of the data. Additionally, data trending can include generating predicted likely future values for the sensor data. In all these cases, trending can be used to facilitate prognosis and fault detection in the turbine engine system.

The startup characterization using the system and method can be used to improve trending during engine startup. Specifically, by providing a more accurate characterization of engine performance during startup, the system and method facilitate comparison of different measurements taken during different startups, under different ambient conditions and at different stages of engine health. Specifically, the estimated time of engine lightoff, $3^{rd}$-phase and other conditions can be used as a reference times to align different measurements for trending. This can improve the accuracy of the trending and thus result in more reliable predictions of future performance.

Additionally, the characterization of startup performance can be used to facilitate improved data mining of turbine engine performance. Specifically, the method facilitates the comparison of engine start data not only for one engine for various ambient conditions but also from engine to engine when a fleet of vehicles are involved. Thus, a large quantity of data can be used in efficient data mining and in the creation of start algorithms.

Additionally, the characterization of startup performance can be used in engine control. In such a system, the estimation of engine conditions would typically be performed in real time. In this case, the temperature and speed would be measured, and their gradients calculated in real time. As with the methods discussed above, the process would commence with the initial starting of the turbine engine that defines the start of the first time interval. After engine starting has commenced, the engine speed gradient is monitored to determine when the engine speed gradient hits a peak. The engine speed gradient peak again would correspond to the beginning of the second time interval discussed above. After the engine speed gradient peak, the engine speed gradient would continue to be monitored as it decreases until it reaches a minimum. The engine speed gradient minimum would again correspond to the estimation of when engine lightoff had occurred. Thus, an estimation of lightoff can be determined in real time.

Furthermore, the engine temperature gradient can also be monitored in real time. Sometime after the engine speed gradient minimum, the engine temperature gradient would likewise peak. The engine temperature gradient peak would again correspond to the end of the second time interval discussed above, and can thus confirm that the engine speed gradient minimum detected previously does in fact correspond to a detection of engine lightoff. Thus, the system and method can be adapted to use the 3-step lightoff detection approach to detect engine lightoff in real time. Then, following the detection of the peak temperature gradient, a local minimum in the engine speed can be detected and used for estimation of $3^{rd}$-phase in real time.

The results of these estimations can then be made available to the control system in real time to improve the control over the engine itself. Such a system can be useful in setting the fuel schedules to complete the startup and bring the engine to an idle speed.

The system and method thus provides the ability to monitor physically relevant phases of a startup by detecting distinct changes in engine behavior as it manifests in such critical variables as core speed and exhaust gas temperature. This allows the sensor data to be trended with reference to real physical events occurring in the engine.

Furthermore, the system and method provide the ability to condense the sensor data required to characterize engine dynamics from several hundred seconds of high speed data to a much smaller set of data points per startup has tremendous implications in engine health monitoring as implementing the approach on-board allows real-time data transfer and makes timely prognostics possible.

The turbine engine startup characterization system and method is particularly applicable to detecting failures in the hydro-mechanical assemblies (HMA) of turbine engines. The fuel system on the turbine engine provides fuel to the engine for proper combustion under all circumstances. The HMA is a major component of the fuel system. It generally comprises a hydro-mechanical metering unit and a fuel pumping unit. One of the most frequent failures related to the HMA is the potentiometer calibration degradation. The potentiometer is a dual element position sensor that measures the Power Lever Angle (PLA). There are two different potentiometers and the two signals are compared to verify that the angle is correct. The PLA sets the aircraft throttle position. The potentiometer can degrade as it wears due to engine modal vibration. The overall effect of the potentiometer degradation is a variance in actual engine speed with commanded engine speed, often seen at startup and idle. Start idle and ground idle will be incorrect and the start fuel schedule will be incorrect. Above the idle speed the problem is sometimes masked because of the feedback control. The other potential failures related to the HMA are boost pump failure, heat exchanger problem, over-speed controller stick, and flow divider failures. Depending on the type of the failures, it may result in cold hung start, hot hung start, fuel leakages, hot starts, or high idle.

The startup characterization system and method can be used to facilitate the detection of HMA anomalies. Specifically, by taking specific sensor data measurements at several of the seven key conditions identified above, the startup can be characterized and analyzed for the detection of HMA anomalies. In a typical HMA application, the most important variables in distinguishing a failed HMA from a healthy HMA are the sensor values and time instants recorded as the temperature gradients and speed gradients reach their peak values. Additionally, the engine temperature (e.g., EGT, EGTDot) and engine speed (e.g., N2 and N2Dot) sensor data taken at the $3^{rd}$ phase is highly indicative of HMA anomalies. To a lesser extent, peak EGTDot, peak EGT, idle and lightoff are also indicative.

Thus, by selectively capturing snapshots of sensor data taken at specified key conditions, the system and method can balance between the need for a large amount of high-speed data for accurately characterizing steady-state as well as transients, and the limited computational resources available on-board and the difficulties associated with storing and transmitting data. For example, some of the computation, such as feature extraction, can be performed on the on-board computer. Extracting features based on the high speed data available during the key conditions can be done with very minimal computational resources that are already available on most aircraft.

Figure 4:
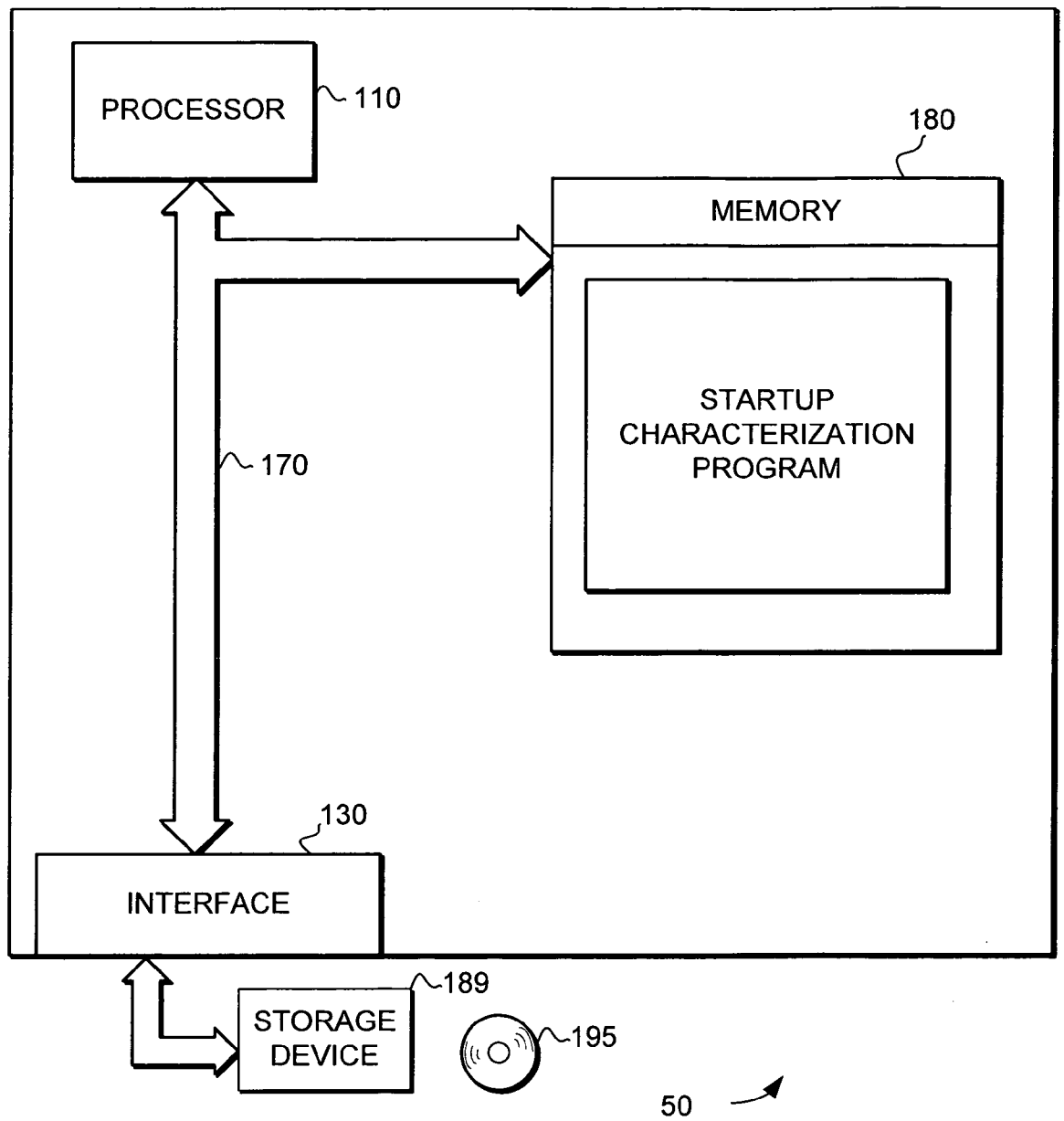
FIG. 4 is a schematic view of a computer system that includes a startup characterization program.

The turbine engine startup characterization system and method can be implemented in wide variety of platforms. Turning now to FIG. 4, an exemplary computer system 50 is illustrated. Computer system 50 illustrates the general features of a computer system that can be used to implement the invention. Of course, these features are merely exemplary, and it should be understood that the invention can be implemented using different types of hardware that can include more or different features. It should be noted that the computer system can be implemented in many different environments, such as onboard an aircraft to provide onboard diagnostics, or on the ground to provide remote diagnostics. The exemplary computer system 50 includes a processor 110, an interface 130, a storage device 189, a bus 170 and a memory 180. In accordance with the preferred embodiments of the invention, the memory 180 includes a startup characterization program.

The processor 110 performs the computation and control functions of the system 50. The processor 110 may comprise any type of processor, include single integrated circuits such as a microprocessor, or may comprise any suitable number of integrated circuit devices and/or circuit boards working in cooperation to accomplish the functions of a processing unit. In addition, processor 110 may comprise multiple processors implemented on separate systems. In addition, the processor 110 may be part of an overall vehicle control, navigation, avionics, communication or diagnostic system. During operation, the processor 110 executes the programs contained within memory 180 and as such, controls the general operation of the computer system 50.

Memory 180 can be any type of suitable memory. This would include the various types of dynamic random access memory (DRAM) such as SDRAM, the various types of static RAM (SRAM), and the various types of non-volatile memory (PROM, EPROM, and flash). It should be understood that memory 180 may be a single type of memory component, or it may be composed of many different types of memory components. In addition, the memory 180 and the processor 110 may be distributed across several different computers that collectively comprise system 50. For example, a portion of memory 180 may reside on the vehicle system computer, and another portion may reside on a ground based diagnostic computer.

The bus 170 serves to transmit programs, data, status and other information or signals between the various components of system 100. The bus 170 can be any suitable physical or logical means of connecting computer systems and components. This includes, but is not limited to, direct hard-wired connections, fiber optics, infrared and wireless bus technologies.

The interface 130 allows communication to the system 50, and can be implemented using any suitable method and apparatus. It can include a network interfaces to communicate to other systems, terminal interfaces to communicate with technicians, and storage interfaces to connect to storage apparatuses such as storage device 189. Storage device 189 can be any suitable type of storage apparatus, including direct access storage devices such as hard disk drives, flash systems, floppy disk drives and optical disk drives. As shown in FIG. 6, storage device 189 can comprise a disc drive device that uses discs 195 to store data.

In accordance with the preferred embodiments of the invention, the computer system 50 includes startup characterization program. Specifically during operation, the startup characterization program is stored in memory 180 and executed by processor 110. When being executed by the processor 110, startup characterization program receives sensor data and determines an estimate of when lightoff and other conditions have occurred from that sensor data. The estimate of these key conditions can then be used as part of a trending system for fault detection and/or a control system for real time control of the turbine engine.

As one example implementation, the startup characterization program can operate on data that is acquired from the turbine engine and periodically uploaded to an internet website. The startup characterization analysis is performed by the web site and the results are used in trending and fault detection and returned back to the technician or other user. Thus, the system can be implemented as part of a web-based diagnostic and prognostic system.

It should be understood that while the present invention is described here in the context of a fully functioning computer system, those skilled in the art will recognize that the mechanisms of the present invention are capable of being distributed as a program product in a variety of forms, and that the present invention applies equally regardless of the particular type of signal bearing media used to carry out the distribution. Examples of signal bearing media include: recordable media such as floppy disks, hard drives, memory cards and optical disks (e.g., disk 195), and transmission media such as digital and analog communication links, including wireless communication links.

The embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit of the forthcoming claims.

The invention claimed is:

1. A method of characterizing startup in a turbine engine, the method comprising the steps of:
   receiving engine temperature sensor data and engine speed sensor data for the turbine engine during startup;
   determining an engine speed peak gradient time of the engine speed sensor data during startup;
   determining an engine temperature peak gradient time of the engine temperature sensor data;
   determining a lightoff time of the turbine engine during startup;
   determining a 3rd phase time of the turbine engine during startup;
   determining a peak temperature time of the turbine engine sensor data; and
   capturing engine data corresponding to the engine speed peak gradient time, the engine temperature peak gradient time, the engine lightoff time, the 3rd phase time, and the peak temperature time to characterize the turbine engine during startup.

2. The method of claim 1 further comprising the step of providing the captured engine data comprises to a fault detection system or an engine control system.

3. The method of claim 1 wherein the step of capturing engine data comprises capturing at least one of time data, a snapshot of engine temperature data and a snapshot of engine speed data corresponding to each of the engine speed peak gradient time, the engine temperature peak gradient time, the engine lightoff time, the 3rd phase time, and the peak temperature time to characterize the turbine engine during startup.

4. The method of claim 1 wherein the step of capturing engine data comprises capturing engine temperature gradient data and engine speed gradient data.

5. The method of claim 1 wherein the step of capturing engine data comprises capturing hot section temperature data or exhaust gas temperature data.

6. The method of claim 1 wherein the step of capturing engine data comprises capturing rotational fan speed data or rotational core speed data.

7. The method of claim 1 wherein the step of capturing engine data comprises capturing power lever angle data.

8. A system for characterizing startup in a turbine engine, the system comprising:
   an engine temperature analyzer, the engine temperature analyzer receiving engine temperature sensor data from the turbine engine to determine an engine temperature peak gradient time of the engine temperature sensor data and a peak temperature time of the turbine engine sensor data;
   an engine speed analyzer, the engine speed analyzer receiving engine speed sensor data from the turbine engine to determine an engine speed peak gradient time of the engine speed sensor data; and
   a condition estimator, the condition estimator determining a lightoff time of the turbine engine during startup and a 3rd phase time of the engine during startup, the condition estimator capturing engine data corresponding to the engine speed peak gradient time, the engine temperature peak gradient time, the engine lightoff time, the 3rd phase time, and the peak temperature time to characterize the turbine engine during startup.

9. The system of claim 8 wherein the condition estimator further provides the engine temperature data and engine speed data to a fault detection system or an engine control system.

10. The system of claim 8 wherein the engine data comprises hot section temperature data or exhaust gas temperature data.

11. The system of claim 8 wherein the engine data comprises rotational fan speed data or rotational core speed data.

12. The system of claim 8 wherein the engine data comprises power lever angle data.

13. The system of claim 8 wherein the engine data comprises capturing engine temperature gradient data and engine speed gradient data.

14. The system of claim 8 wherein the engine data comprises at least one of time data, a snapshot of engine temperature data and a snapshot of engine speed data corresponding to each of the engine speed peak gradient time, the engine temperature peak gradient time, the engine lightoff time, the 3rd phase time, and the peak temperature time to characterize the turbine engine during startup.

15. A computer readable medium encoding a computer program product, the program product comprising:
   a turbine engine startup characterization program, the turbine engine startup characterization program including:
   an engine temperature analyzer, the engine temperature analyzer receiving engine temperature sensor data from the turbine engine to determine an engine temperature peak gradient time of the engine temperature sensor data and a peak temperature time of the turbine engine sensor data;
   an engine speed analyzer, the engine speed analyzer receiving engine speed sensor data from the turbine engine to determine an engine speed peak gradient time of the engine speed sensor data; and
   a condition estimator, the condition estimator determining a lightoff time of the turbine engine during startup and a 3rd phase time of the engine during startup, the condition estimator capturing engine data corresponding to the engine speed peak gradient time, the engine temperature peak gradient time, the engine lightoff time, the 3rd phase time, and the peak temperature time to characterize the turbine engine during startup.

16. The program product of claim 15 wherein the condition estimator further provides the captured engine data to a fault detection system or to an engine control system.

17. The program product of claim 15 wherein the engine data comprises hot section temperature data or exhaust gas temperature data.

18. The program product of claim 15 wherein the engine data comprises rotational fan speed data or rotational core speed data.

19. The program product of claim 15 wherein the engine data comprises power lever angle data.

20. The program product of claim 15 wherein the engine data comprises at least one of time data, a snapshot of engine temperature data and a snapshot of engine speed data corresponding to each of the engine speed peak gradient time, the engine temperature peak gradient time, the engine lightoff time, the 3rd phase time, and the peak temperature time to characterize the turbine engine during startup.

* * * * *